United States Patent [19]

Hirano

[11] Patent Number: 4,793,698

[45] Date of Patent: Dec. 27, 1988

[54] TELEPHOTO LENS SYSTEM

[75] Inventor: Hiroyuki Hirano, Tokyo, Japan

[73] Assignee: Asahi Kogaku Kabushiki Kaisha, Tokyo, Japan

[21] Appl. No.: 33,421

[22] Filed: Apr. 2, 1987

[30] Foreign Application Priority Data

Apr. 2, 1986 [JP] Japan .................................. 61-75771

[51] Int. Cl.$^4$ .......................... G02B 13/02; G02B 9/64
[52] U.S. Cl. ..................................... 350/454; 350/455
[58] Field of Search ................................ 350/454, 455

[56] References Cited

U.S. PATENT DOCUMENTS 4,126,378 11/1978 Ogino .................................. 350/455

Primary Examiner—Bruce Y. Arnold
Assistant Examiner—Rebecca D. Gass
Attorney, Agent, or Firm—Sughrue, Mion, Zinn, Macpeak & Seas

[57] ABSTRACT

A telephoto lens system, both compact and capable of close-in focusing, comprising, in order from the object side, a first lens unit of positive power, a second lens unit of negative power, a third lens unit of either power and a fourth lens unit of positive power. There are additionally imposed five numerical conditions on the focal lengths of the lens units, their separation and their displacement. The second and third lens units are displaced by differing amounts for focusing.

9 Claims, 8 Drawing Sheets

TELEPHOTO LENS SYSTEM

BACKGROUND OF THE INVENTION

1. Field of the Invention

The present invention relates to a telephoto lens system that features an aperture ratio ($F_{NO}$) of 1:2.8 and a half viewing angle of the order of 9°. In particular, the present invention relates to an improved method of achieving focusing with this telephoto lens system.

2. Background of the Invention

Focusing with photographic lenses is generally achieved by displacing the overall lens system. However, in order to provide improved operability, lens systems that achieve focusing by displacing only part of the system have been proposed (see, for example, Unexamined Published Japanese Patent Application Nos. 65820/1984, 65821/1984, 169117/1984 and 116709/1984). In this focusing system, the overall focal length is decreased as the object to be imaged approaches the lens system so that, for a given object-to-image distance, the image magnification that can be attained is decreased as compared with the case where focusing is achieved by displacement of the overall system. In order to attain a magnification comparable to the overall-displacement case, a sufficiently large space must be provided to allow for an increased displacement of the moving components but then, size reduction of the system becomes more difficult to achieve than in the case where the overall system is displaced to effect focusing. If the displacement of the moving components is minimized, a complicated lens arrangement becomes necessary to effect compensation for the aberrations that occur where the object-to-image distance is reduced.

For the reasons stated above, the highest magnification that can be achieved by the conventional systems are within the range of from 1/10 to 1/6.

SUMMARY OF THE INVENTION

Accordingly, an object of the present invention is to provide a compact telephoto lens system that achieves focusing by displacing part of the system and which ensures good imaging performance over a wide range of distances from infinity to a maximum magnification of approximately ¼.

The invention can be summarized as comprising four lens units having, in order from the object side, positive power, negative power, positive or negative power and positive power. Focusing is achieved by displacing both the second and third lens units by differing amounts with respect to the first and fourth lens units. Additionally there are five numerical conditions on the focal lengths of the lens units, their separation and their displacement.

DETAILED DESCRIPTION OF THE PREFERRED EMBODIMENTS

Figure 1:
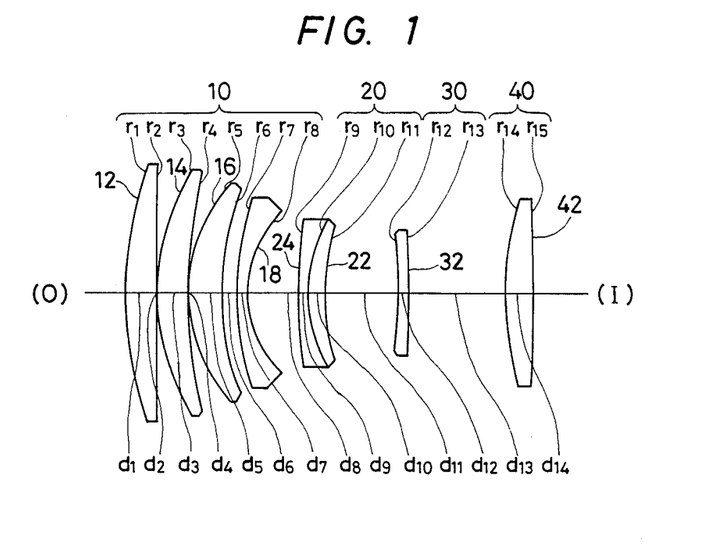
FIGS. 1, 4, 7, 10 and 13 are simplified cross-sectional views of the telephoto lens systems constructed in Examples 1, 2, 3, 4 and 5, respectively.
Figure 4:
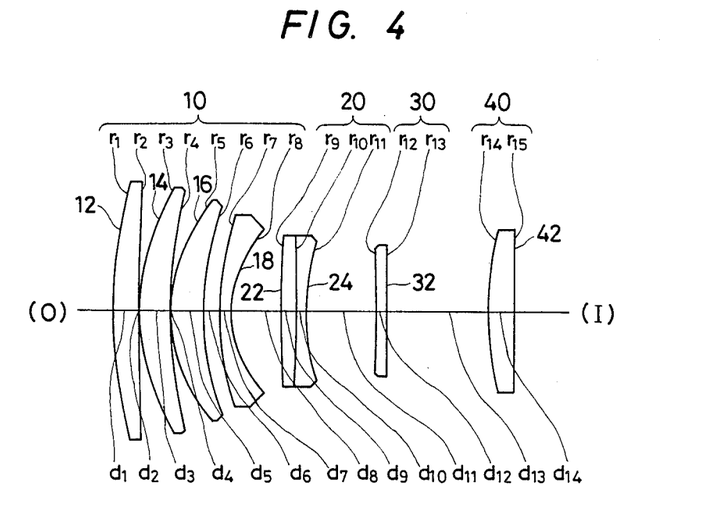
Figure 7:
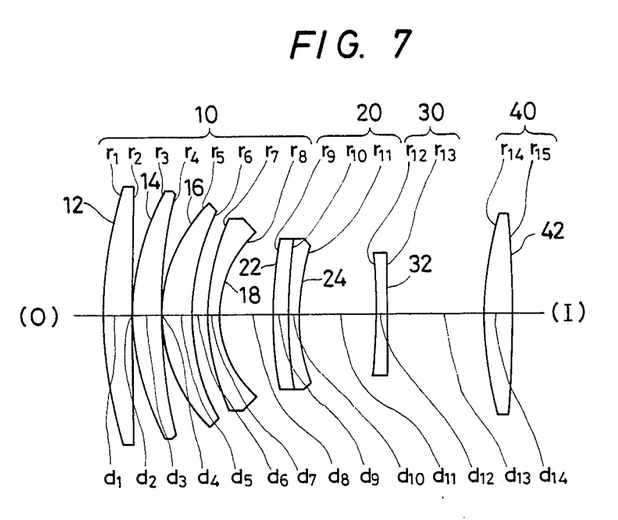
Figure 10:
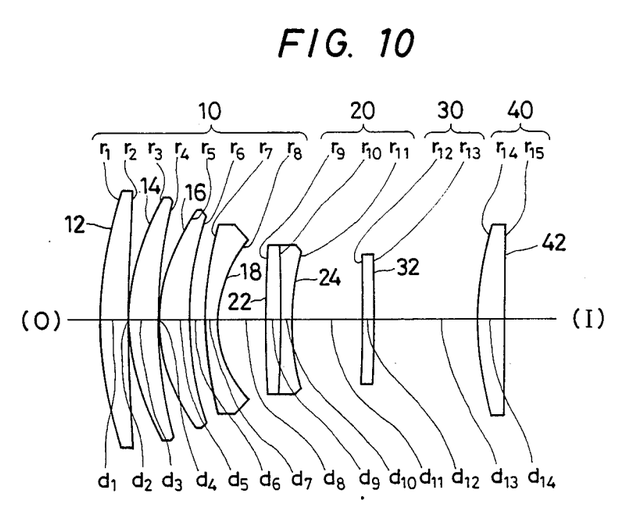
Figure 13:
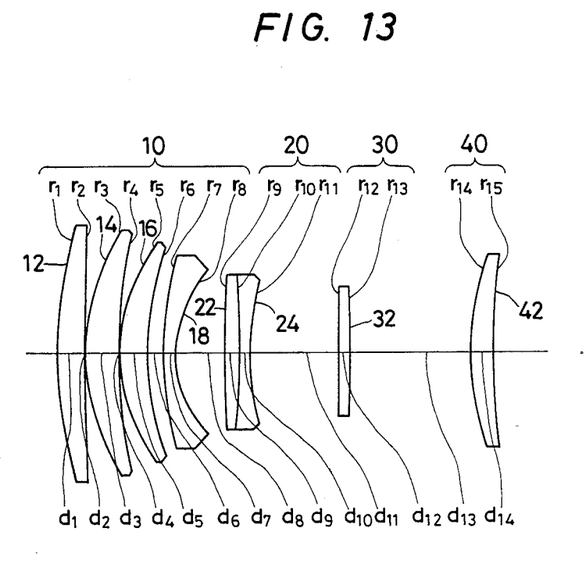

The structures of five embodiments of the invention are illustrated respectively in FIGS. 1, 4, 7, 10 and 13.

The telephoto lens system of the present invention comprises, in order from the object side, a first lens unit 10 having a positive power, a second lens unit 20 having a negative power, a third lens unit 30 having a negative or positive power, and a fourth lens unit 40 having a positive power. The lens system performs focusing by displacing the second and third lens units. The lens system further satisfies the following conditions:

(1) $-2.5 < f/f_{2,3} < -0.9$
(2) $-0.25 < f_2/f_3 < 0.90$
(3) $0.40 < X_3/X_2 < 1.00$
(4) $0.05 < d_{2-3}/f < 0.15$
(5) $0.10 < d_{3-4}/f < 0.18$.

In these equations:

f is the overall focal length with an infinitely distant object being brought to focus;

$f_{2,3}$ is the composite focal length of the second and third lens units at this infinite focus;

$f_i$ is the focal length of an i-th lens unit;

$X_i$ is the amount of displacement of the i-th lens unit; and $d_{i-j}$ is the axial distance between the i-th lens unit and the j-th lens unit.

According to the described embodiments, the telephoto lens system of the present invention has the following lens arrangement. The first lens unit 10 comprises, in order from the object side, a first lens element 12, a second lens element 14 and a third lens element 16, each having a convex positive meniscus directed toward the object. The first lens unit 10 then further comprises a fourth lens element 18 having a convex negative meniscus directed toward the object. The second lens unit 20 is a cemented lens comprising at least one positive lens element 22 and at least one negative lens element 24, although a single element 22 and a single element 24 are shown in the FIG. The third lens unit 30 comprises at least one negative or positive lens element 32 having a smaller power than the second lens unit. The fourth lens unit 40 comprises at least one positive lens element 42. Again, in the Figure, only single elements 32 and 42 are shown.

As already mentioned, the telephoto lens system of the present invention comprises, in order from the object side, a first lens unit 10 having a positive power, a second lens unit 20 having a negative power, a third lens unit 30 having a negative or positive power and a fourth lens unit 40 having a positive power. It attains the object of the invention by satisfying the conditions (1) to (5), each of which is hereinafter described in detail.

Condition (1) sets forth the requirement that should be met by the composite power of the second and third lends units 20 and 30. If the lower limit of this condition is not reached, the power of the moving lens units becomes excessive and great aberrational changes are likely to occur in imaging an object at near distance. Furthermore, a large spherical aberration will occur when imaging is performed for a magnification of about ¼ and considerable difficulty is encountered in an attempt made to achieve the object of the present invention. If the upper limit of condition (1) is exceeded, the telephoto ratio is increased to provide a condition unfavorable for the purpose of reducing the overall size of the system.

Condition (2) sets forth the requirement that should be met by the ratio of the power of the second lens unit 20 to that of the third lens unit 30. These two lens units 20 and 30 are necessary in order to compensate for the spherical and coma aberrations and astigmatism that have developed in the first lens unit 10. If both lens units 20 and 30 have a negative power, it is desired that the third lens unit 30 which is auxiliary to the second lens unit 20 working as a divergent unit has a somewhat smaller power than the second lens unit 20. To this end, the upper limit of condition (2) is preferably not exceeded. A third lens unit 30 having a positive power is effective for the purpose of correcting a coma aberration but if its positive power is increased, it will come to act as a convex surface (convergent surface) and the change in aberrations, especially the one of a spherical aberration, will increase as the object-to-image distance is progressively decreased. To prevent this problem, the lower limit of condition (2) is preferably satisfied.

Condition (3) sets forth the requirement that should be met by the ratio of displacement of the second lens unit 20 necessary to achieve focusing to that of the third lens unit 30. This condition is related to conditions (4) and (5) and is necessary for realizing a compact overall system with the space necessary to achieve the intended magnification being provided by maintaining the distance between the second and third lens units and that between the third and fourth lens units within the ranges specified by conditions (4) and (5). If the upper limit of condition (3) is exceeded, condition (5) is not satisfied and the third lens unit 30 will contact the fourth lens unit before the intended magnification is attained. On the other hand, if the lower limit of condition is not reached, condition (4) is not satisfied and the second lens unit 20 will contact the third lens unit 30 before the intended magnification is attained.

Condition (4) sets forth the requirement that should be met by the axial distance between the second and third lens units 20 and 30 in order that a flare component which will cause image deterioration is removed while an adequate quantity of light is received under the conditions necessary for compactness and over the full range of use. If the upper limit of condition (4) is exceeded, the overall length of the system is extended and the requirement for compactness is not met. In addition, if one wants to ensure that an adequate quantity of light is received at high magnification, the diameter of the third lens unit 30 is increased too much to remove the flare component occurring at low magnification and image deterioration will result. If the lower limit of condition (4) is not reached, a compact lens system is also unattainable since the diameter of the third lens unit which is determined by on-axis marginal rays of light is increased. In addition, image deterioration will occur but, this time, the reason is the failure to remove the flare component occurring at high magnification. A further problem with the case where the lower limit of condition (4) is not reached is that if condition (3) is met, the second and third lens units 20 and 30 will contact each other and a high magnification of approximately $\frac{1}{4}$ can not be attained.

Condition (5) sets for the requirement that should be met by the axial distance between the third and fourth lens units 30 and 40 in order to satisfy condition (3) and to provide a compact lens system. If the upper limit of condition (5) is exceeded, a favorable condition for compensation of field curvature and distortion is obtained but, on the other hand, not only the diameter of the fourth lens unit 40 but also the overall length of the lens system is increased and a compact system is not attainable. If the lower limit of condition (5) is not reached, a favorable condition for producing a compact system results but, if condition (3) is satisfied, the third lens unit 30 will contact the fourth lens unit 40. Furthermore, it is then impossible to attain a magnification of about $\frac{1}{4}$ nor can the field curvature and distortion be compensated in an effective manner.

In the practice of the present invention, the first lens unit 10 preferably comprises, in order from the object side, four elements, the first three of which are positive and the fourth element being negative. This arrangement is effective for the purposes of providing a compact system and achieving efficient compensation of aberrations. If the first lens unit 10 is composed of three elements which are positive, positive and negative in order from the object side, the power of each positive lens elements becomes too strong to achieve efficient compensation of spherical and coma aberrations. If the first lens unit arrangement is positive, negative and positive, or positive, positive, negative and positive, a condition favorable to correction of chromatic aberration results but, on the other hand, it is difficult to attain a small telephoto ratio. If the first lens unit arrangement is positive, positive, positive and negative, it is not advantageous for the purpose of compensation of chromatic aberration but in the embodiment of the present invention discussed above, this problem is solved by forming the first positive lens element 12 of a glass having a relatively small dispersion.

The second lens unit 20 is movable, so desirably this lens unit itself is achromatic. To this end, it is important that the second lens unit 20 employs at least one each of a positive and a negative lens elements having different dispersion indices such as to minimize the variation of chromatic aberration that will occur as a result of that lens unit.

The third lens unit 30 takes part in compensating for the spherical aberration occurring in the first lens unit 10 and for the Petzval sum. To achieve efficient compensation of spherical aberration, the first plane ($r_{12}$) of the third lens unit 30 is preferably divergent and has its concave surface directed toward the object. The overall power of the third lens unit 30 may be comparatively small in consideration of the balance that should be struck between spherical aberration and other aberrations. If the third lens unit 30 which is also a movable unit is composed of a single negative lens element, it is desirably made of glass having the smallest possible dispersion.

The fourth lens unit 40 has a positive power for the specific purpose of attaining a balance in the compensation of field curvature and distortion.

Numerical values for the five embodiments are presented in the tables of the five respective examples. In these tables, f is a focal length, $F_{NO}$ is a F number, $\omega$ is a half viewing angle, $r_i$ is the radius of curvature of an individual lens surface, $d_i$ is the thickness or axial distance of an individual lens element, $N_d$ is the refractive index of an individual lens element at the d-line, and $v_d$ is the Abbe number of an individual lens element. The parameters $r_i$ and $d_i$ are illustrated in the structural drawings of the embodiments.

| i | f = 100  $r_i$ | $F_{NO} = 2.8$  $d_i$ | $\omega = 9.4°$  $N_d$ | $\nu_d$ |
|---|---|---|---|---|
| | | Example 1 | | |
| 1 | 54.757 | 4.323 | 1.48749 | 70.1 |
| 2 | 641.659 | 0.130 | | |
| 3 | 32.350 | 4.475 | 1.58913 | 61.0 |
| 4 | 74.003 | 0.130 | | |
| 5 | 22.613 | 4.651 | 1.71300 | 53.8 |
| 6 | 40.543 | 2.077 | | |
| 7 | 41.889 | 1.527 | 1.76182 | 27.5 |
| 8 | 15.566 | 7.247–25.603 | | |
| 9 | 66.442 | 1.527 | 1.77250 | 49.6 |
| 10 | 20.897 | 2.329 | 1.74077 | 27.8 |
| 11 | 30.363 | 10.753–3.410 | | |
| 12 | −68.557 | 1.527 | 1.51633 | 64.1 |
| 13 | −183.222 | 14.075–3.061 | | |
| 14 | 45.135 | 4.055 | 1.53172 | 48.9 |
| 15 | −240.880 | | | |
| $f/f_{2,3}$ | = | −1.893 | | |
| $f_2/f_3$ | = | 0.343 | | |
| $X_3/X_2$ | = | 0.600 | | |
| $d_{2-3}/f$ | = | 0.108 | | |
| $d_{3-4}/f$ | = | 0.141 | | |
| | | Example 2 | | |
| 1 | 67.026 | 3.730 | 1.60311 | 60.7 |
| 2 | 556.533 | 0.153 | | |
| 3 | 32.907 | 4.379 | 1.60311 | 60.7 |
| 4 | 73.441 | 0.130 | | |
| 5 | 23.514 | 4.477 | 1.72916 | 54.7 |
| 6 | 41.388 | 2.244 | | |
| 7 | 41.284 | 1.664 | 1.78470 | 26.2 |
| 8 | 16.233 | 7.131–25.055 | | |
| 9 | 127.347 | 2.176 | 1.80518 | 25.4 |
| 10 | −581.729 | 1.527 | 1.77250 | 49.6 |
| 11 | 35.225 | 9.973–1.907 | | |
| 12 | −676.392 | 1.527 | 1.48749 | 70.1 |
| 13 | 2975.803 | 14.725–4.867 | | |
| 14 | 44.422 | 3.818 | 1.53172 | 48.9 |
| 15 | 3489.672 | | | |
| $f/f_{2,3}$ | = | −1.627 | | |
| $f_2/f_3$ | = | 0.058 | | |
| $X_3/X_2$ | = | 0.550 | | |
| $d_{2-3}/f$ | = | 0.100 | | |
| $d_{3-4}/f$ | = | 0.147 | | |
| | | Example 3 | | |
| 1 | 60.343 | 4.103 | 1.48749 | 70.1 |
| 2 | 905.499 | 0.153 | | |
| 3 | 35.340 | 3.936 | 1.67000 | 57.4 |
| 4 | 69.951 | 0.130 | | |
| 5 | 21.763 | 4.295 | 1.77250 | 49.6 |
| 6 | 32.066 | 2.244 | | |
| 7 | 30.845 | 1.664 | 1.80518 | 25.4 |
| 8 | 15.394 | 7.548–25.173 | | |
| 9 | 50.275 | 2.176 | 1.84666 | 23.9 |
| 10 | 64.952 | 1.527 | 1.83481 | 42.7 |
| 11 | 28.119 | 11.166–5.879 | | |
| 12 | −91.525 | 1.527 | 1.77250 | 49.6 |
| 13 | −1975.203 | 13.947–1.609 | | |
| 14 | 46.649 | 4.233 | 1.53172 | 48.9 |
| 15 | −140.980 | | | |
| $f/f_{2,3}$ | = | −2.088 | | |
| $f_2/f_3$ | = | 0.669 | | |
| $X_3/X_2$ | = | 0.700 | | |
| $d_{2-3}/f$ | = | 0.112 | | |
| $d_{3-4}/f$ | = | 0.140 | | |
| | | Example 4 | | |
| 1 | 53.928 | 4.046 | 1.62041 | 60.3 |
| 2 | 267.552 | 0.153 | | |
| 3 | 32.793 | 4.235 | 1.65160 | 58.5 |
| 4 | 68.590 | 0.130 | | |
| 5 | 24.931 | 4.353 | 1.69100 | 54.8 |
| 6 | 46.836 | 2.244 | | |
| 7 | 49.614 | 1.664 | 1.76182 | 26.5 |
| 8 | 16.644 | 6.936–19.690 | | |
| 9 | 154.363 | 2.176 | 1.80518 | 25.4 |
| 10 | −246.115 | 1.527 | 1.77250 | 49.7 |
| 11 | 36.140 | 10.132–6.499 | | |
| 12 | −564.441 | 1.527 | 1.48749 | 70.1 |
| 13 | −416.177 | 14.913–0.382 | | |
| 14 | 44.002 | 3.742 | 1.53172 | 48.9 |
| 15 | 695.981 | | | |
| $f/f_{2,3}$ | = | −1.5421 | | |
| $f_2/f_3$ | = | −0.0195 | | |
| $X_3/X_2$ | = | 0.8 | | |
| $d_{2-3}/f$ | = | 0.1013 | | |
| $d_{3-4}/f$ | = | 0.1491 | | |
| | | Example 5 | | |
| 1 | 62.677 | 3.920 | 1.48749 | 70.1 |
| 2 | 606.780 | 0.153 | | |
| 3 | 31.845 | 4.618 | 1.71300 | 53.8 |
| 4 | 74.401 | 0.130 | | |
| 5 | 25.188 | 4.101 | 1.72916 | 54.7 |
| 6 | 42.626 | 2.244 | | |
| 7 | 48.469 | 1.664 | 1.78470 | 26.2 |
| 8 | 16.867 | 7.047–26.023 | | |
| 9 | 139.752 | 2.176 | 1.80518 | 25.4 |
| 10 | −150.884 | 1.527 | 1.77250 | 49.7 |
| 11 | 39.537 | 12.672–2.874 | | |
| 12 | −4198.700 | 1.527 | 1.77250 | 49.7 |
| 13 | −281.544 | 17.435–2.737 | | |
| 14 | 39.396 | 3.121 | 1.53172 | 48.9 |
| 15 | 102.040 | | | |
| $f/f_{2,3}$ | = | −1.0333 | | |
| $f_2/f_3$ | = | −0.1921 | | |
| $X_3/X_2$ | = | 0.6 | | |
| $d_{2-3}/f$ | = | 0.1267 | | |
| $d_{3-4}/f$ | = | 0.1744 | | |

Figure 2:
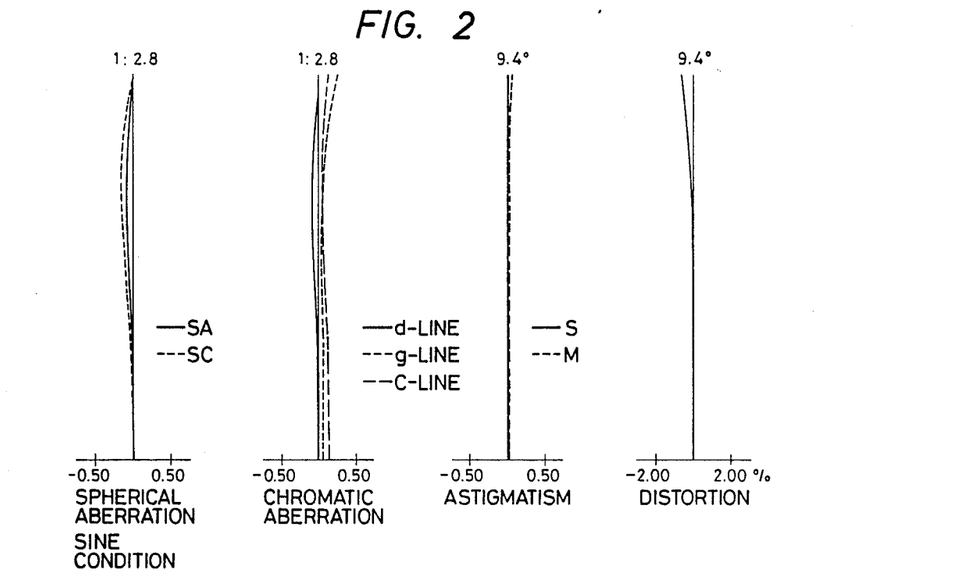
FIGS. 2, 5, 8, 11 and 14 are graphs plotting the aberration curves obtained by imaging an infinitely distant object in Examples 1 to 5, respectively.
Figure 5:
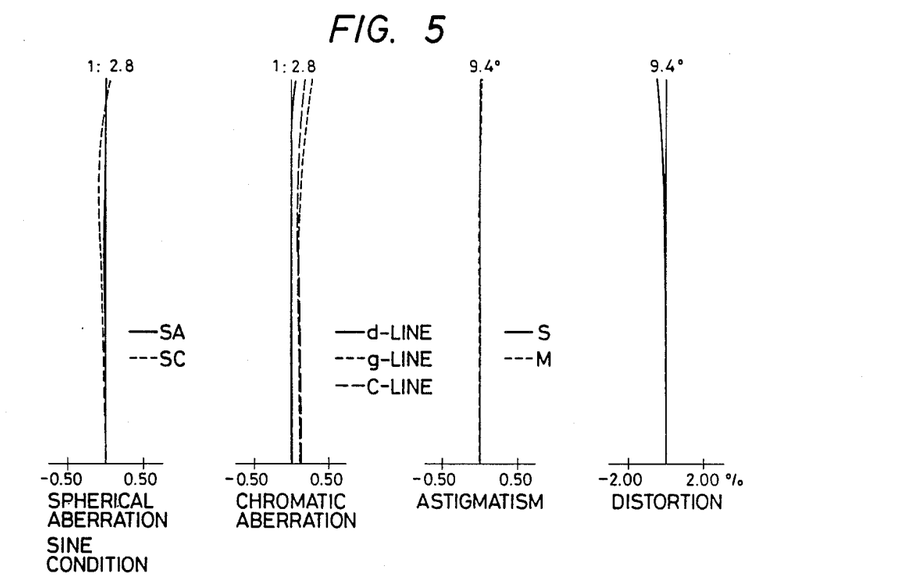
Figure 8:
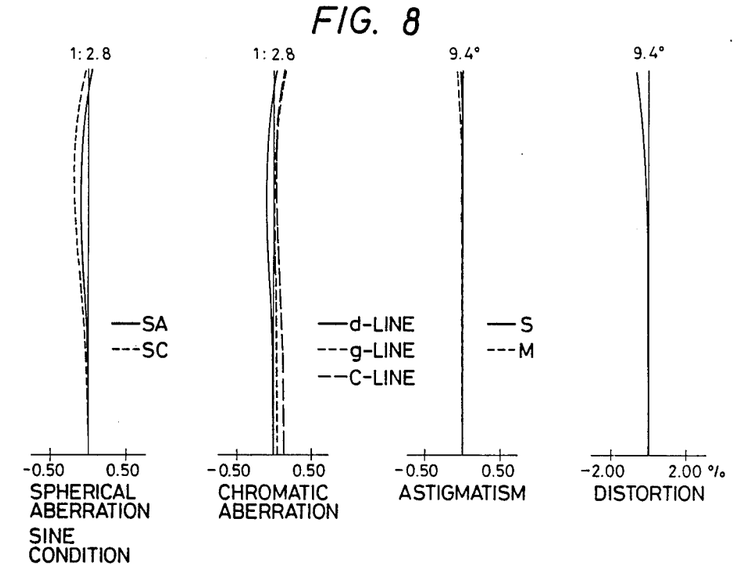
Figure 11:
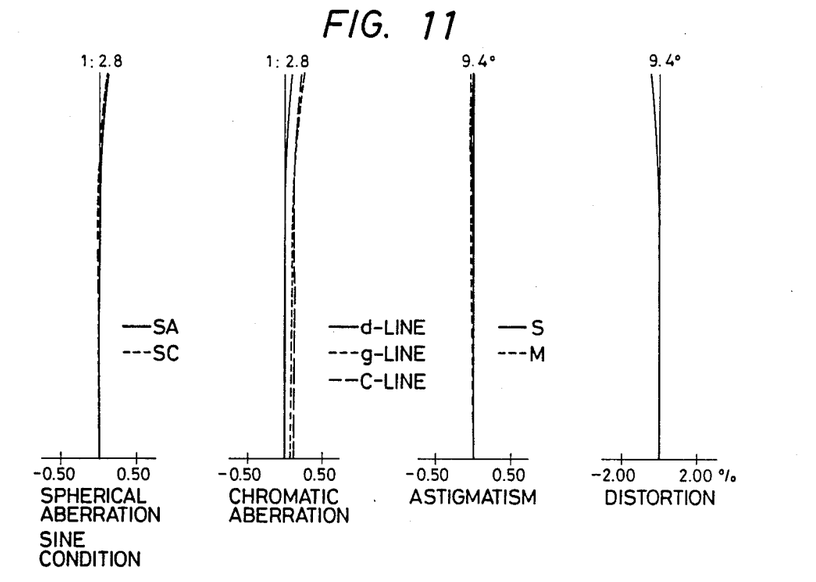
Figure 14:
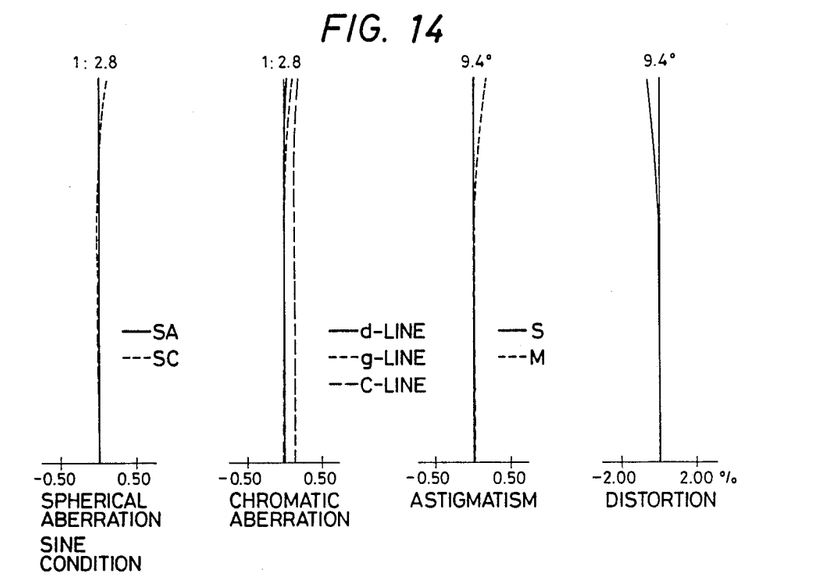

Also given for each of the five embodiments of the invention are two figures containing aberrational data. The first set of figures, namely FIGS. 2, 5, 8, 11 and 14 contain the aberrational data for the five examples when they are imaging an object at infinity. In these figures, the first graph plots spherical aberration (SA) and sine condition (SC) as a function of aperture. The second graph plots the chromatic aberration for the d-line, g-line and C-line. The third graph plots astigmatism as a function of half viewing angle along the sagittal direction (S) and the meridional direction (M). The fourth graph plots distortion as a function of half viewing angle.

Figure 3:
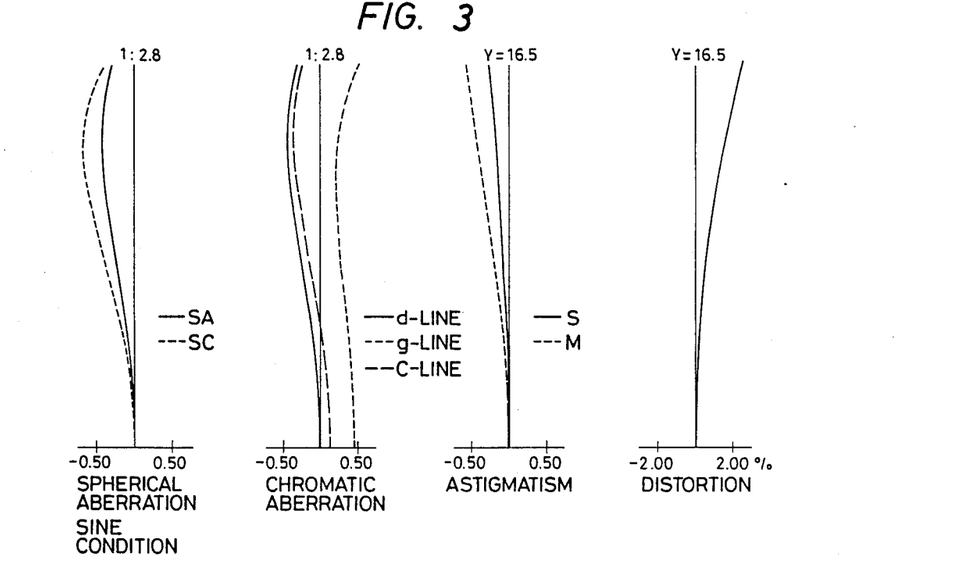
FIGS. 3, 6, 9, 12 and 15 are graphs plotting the aberration curves obtained by imaging at a magnification of ¼ in Examples 1 to 5, respectively.
Figure 6:
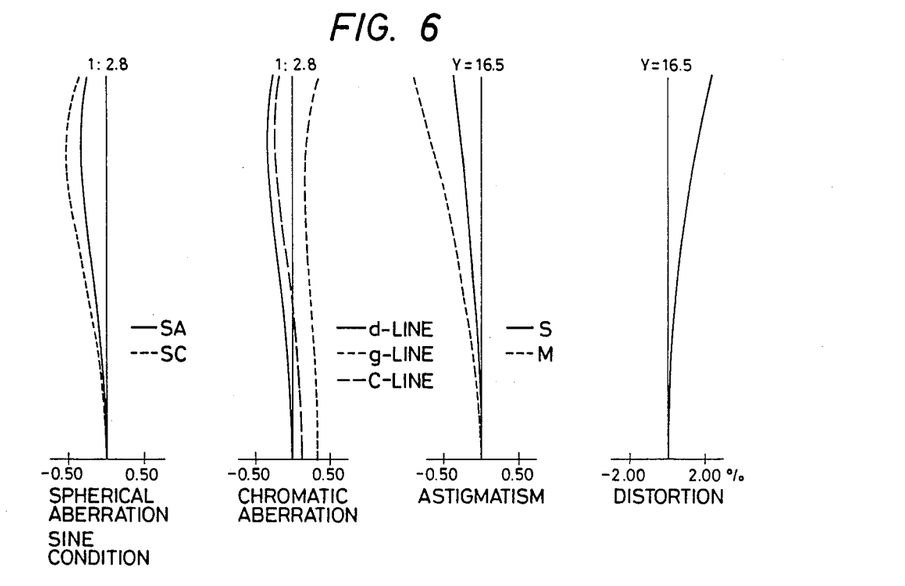
Figure 9:
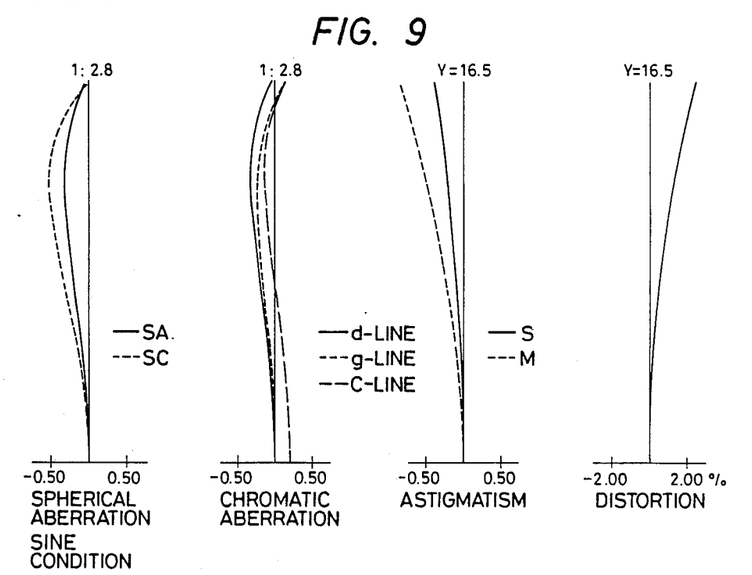
Figure 12:
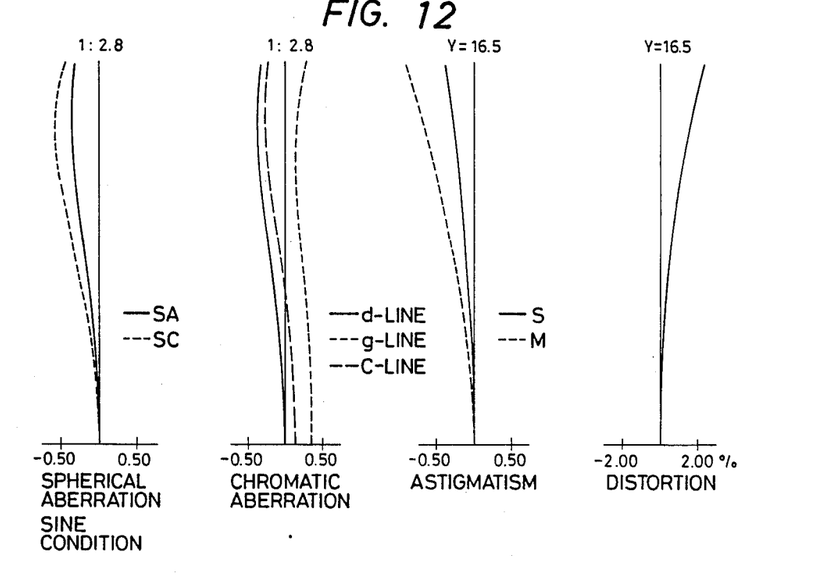
Figure 15:
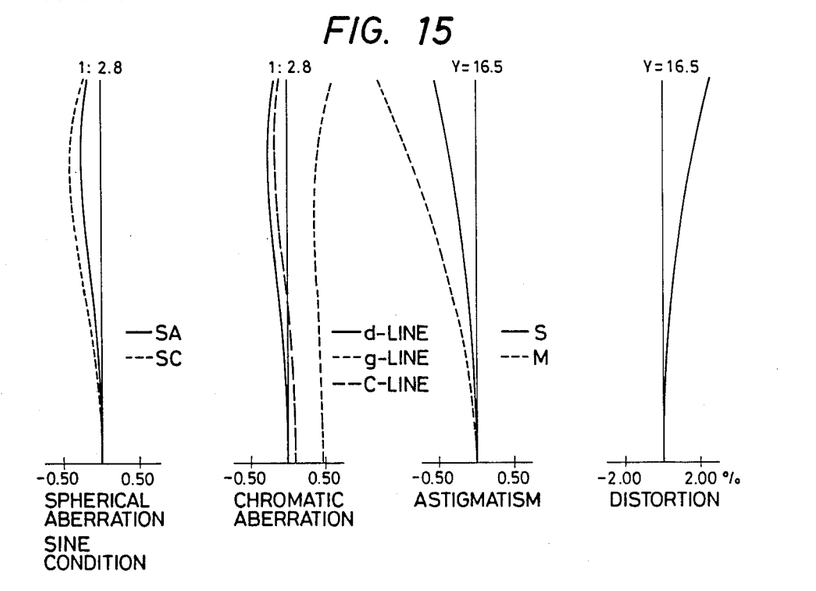

The second set of figures for aberrational data, namely FIGS. 3, 6, 9, 12 and 15 contain data for the five examples when they image at a magnification of ¼. The data format is the same as for the infinite focus except that image height (Y) is used for the ordinate in the third and fourth graphs.

As described in the foregoing, the telephoto lens system of the present invention is composed of four lens units, the first unit being positive, and second unit being negative, the third being negative or positive, and the fourth being positive. This telephoto lens system achieves focusing by displacing not the overall system, but only the second and third lens units. Satisfaction of the conditions (1) to (5) allows the telephoto lens system of the present invention to be compact and to afford good performance over a wide range from infinity to a maximum magnification (of about ¼) with effective compensation of aberrations.

What is claimed is:

1. A telephoto lens system, comprising, in order from an object side, a first lens unit having a positive power, a second lens unit having a negative power, a third lens unit having a positive power, and a fourth lens unit having a positive power, and which achieves focusing by displacing the second and third lens units, said telephoto lens system satisfying the following conditions (1) to (5):
- (1) $-2.5 < f/f_{2,3} < -0.9$
- (2) $-0.25 < f_2/f_3 < 0.90$
- (3) $0.40 < X_3/X_2 < 1.00$
- (4) $0.05 < d_{2-3}/f < 0.15$
- (5) $0.10 < d_{3-4}/f < 0.18$ wherein:
- f: an overall focal length of said first through fourth lens units with an infinitely distant object being brought to focus;
- $f_{2,3}$: a composite focal length of the second and third lens units with said infinitely distant object being brought to focus;
- $f_i$: a focal length of an i-th one of said lens units;
- $X_i$: an amount of displacement of said i-th one of said lens units; and
- $d_{i-j}$: an axial distance between an i-th one and a j-th one of said lens units.

2. A telephoto lens system according to claim 1 wherein the first lens unit comprises, in order from the object side, a first, a second and a third lens element, each having a convex positive meniscus directed toward said object side, and a fourth lens element having a convex negative meniscus directed toward said object side, the second lens unit being a cemented lens that is composed of a positive lens element and a negative lens element, the third lens unit comprising a positive lens element having a smaller power than said second lens unit, and the fourth lens unit being composed of at least one positive lens element.

3. A telephoto lens system as recited in claim 2:
wherein said first, second, third and fourth lens elements of said first lens unit are respectively identified by i=1, 3, 5 and 7, said lens elements of said second lens unit in order from said object side are respectively identified by i=9 and 10, said lens element of said third lens unit is identified by i=12 and said lens element of said fourth lens unit being identified by i=14;

wherein an i-th one of said lens elements has a radius of curvature facing toward said object side of $r_i$, a radius of curvature facing away from said object side of $r_{i+1}$, a thickness of $d_i$, an axial distance to a separated lens element on a side away from said object side of $d_{i+1}$, and a refractive index of $N_i$; and wherein said i-th lens elements satisfy the following table:

| i | $r_i$ | $d_i$ | $N_d$ | $v_d$ |
| --- | --- | --- | --- | --- |
| 1 | 53.928 | 4.046 | 1.62041 | 60.3 |
| 2 | 267.552 | 0.153 | | |
| 3 | 32.793 | 4.235 | 1.65160 | 58.5 |
| 4 | 68.590 | 0.130 | | |
| 5 | 24.931 | 4.353 | 1.69100 | 54.8 |
| 6 | 46.836 | 2.244 | | |
| 7 | 49.614 | 1.664 | 1.76182 | 26.5 |
| 8 | 16.644 | 6.936–19.690 | | |
| 9 | 154.363 | 2.176 | 1.80518 | 25.4 |
| 10 | −246.115 | 1.527 | 1.77250 | 49.7 |
| 11 | 36.140 | 10.132–6.499 | | |
| 12 | −564.441 | 1.527 | 1.48749 | 70.1 |
| 13 | −416.177 | 14.913–0.382 | | |
| 14 | 44.002 | 3.742 | 1.53172 | 48.9 |
| 15 | 695.981 | | | |

4. A telephoto lens system as recited in claim 2:
wherein said first, second, third and fourth lens elements of said first lens unit are respectively identified by i=1, 3, 5 and 7, said lens elements of said second lens unit in order from said object side are respectively identified by i=9 and 10, said lens element of said third lens unit is identified by i=12 and said lens element of said fourth lens unit being identified by i=14;

wherein an i-th one of said lens elements has a radius of curvature facing toward said object side of $r_i$, a radius of curvature facing away from said object side of $r_{i+1}$, a thickness of $d_i$, an axial distance to a separated lens element on a side away from said object side of $d_{i+1}$, and a refractive index of $N_i$; and wherein said i-th lens elements satisfy the following table:

| i | $r_i$ | $d_i$ | $N_d$ | $v_d$ |
| --- | --- | --- | --- | --- |
| 1 | 62.677 | 3.920 | 1.48749 | 70.1 |
| 2 | 606.780 | 0.153 | | |
| 3 | 31.845 | 4.618 | 1.71300 | 53.8 |
| 4 | 74.401 | 0.130 | | |
| 5 | 25.188 | 4.101 | 1.72916 | 54.7 |
| 6 | 42.626 | 2.244 | | |
| 7 | 48.469 | 1.664 | 1.78470 | 26.2 |
| 8 | 16.867 | 7.047–26.023 | | |
| 9 | 139.752 | 2.176 | 1.80518 | 25.4 |
| 10 | −150.884 | 1.527 | 1.77250 | 49.7 |
| 11 | 39.537 | 12.672–2.874 | | |
| 12 | −4198.700 | 1.527 | 1.77250 | 49.7 |
| 13 | −281.544 | 17.435–2.737 | | |
| 14 | 39.396 | 3.121 | 1.53172 | 48.9 |
| 15 | 102.040 | | | |

5. A telephoto lens system comprising, in order from an object side, a first lens unit having a positive power, a second lens unit having a negative power, a third lens unit having a negative power, and a fourth lens unit having a positive power, and which achieves focusing by displacing the second and third lens unit, said telephoto lens system satisfying the following conditions (1) to (5):
- (1) $-2.5 < f/f_{2,3} < -0.9$
- (2) $-0.25 < f_2/f_3 < 0.90$
- (3) $0.40 < X_3/X_2 < 1.00$
- (4) $0.05 < d_{2-3}/f < 0.15$
- (5) $0.10 < d_{3-4}/f < 0.18$ wherein:
- f: an overall focal length of said first through fourth lens units with an infinitely distant object being brought to focus;
- $f_{2,3}$: a composite focal length of the second and third lens units with said infinitely distant object being brought to focus;
- $f_i$: a focal length of an i-th one of said lens units;
- $x_i$: an amount of displacement of said i-th one of said lens units; and
- $d_{i-j}$: an axial distance between an i-th one and a j-th one of said lens units.

6. A telephoto lens system according to claim 5 wherein the first lens unit comprises, in order from the object side, a first, a second and a third lens element, each having a convex positive meniscus directed toward said object side, and a fourth lens element having a convex hegative meniscus directed toward said object side, the second lens unit being a cemented lens that is composed of a positive lens element and a negative lens element, the third lens unit comprising a negative lens element having a smaller power than said second lens unit, and the fourth lens unit being composed of at least one positive lens element.

7. A telephoto lens system as recited in claim 6:

wherein said first, second, third and fourth lens elements of said first lens unit are respectively identified by i=1, 3, 5 and 7, said lens elements of said second lens unit in order from said object side are respectively identified by i=9 and 10, said lens element of said third lens unit is identified by i=12 and said lens element of said fourth lens unit being identified by i=14;

wherein an i-th one of said lens elements has a radius of curvature facing toward said object side of $r_i$, a radius of curvature facing away from said object side of $r_{i+1}$, a thickness of $d_i$, an axial distance to a separated lens element on a side away from said object side of $d_{i+1}$, and a refractive index of $N_i$; and wherein said i-th lens elements satisfy the following table:

| i | $r_i$ | $d_i$ | $N_d$ | $\nu_d$ |
|---|---|---|---|---|
| 1 | 54.757 | 4.323 | 1.48749 | 70.1 |
| 2 | 641.659 | 0.130 | | |
| 3 | 32.350 | 4.475 | 1.58913 | 61.0 |
| 4 | 74.003 | 0.130 | | |
| 5 | 22.613 | 4.651 | 1.71300 | 53.8 |
| 6 | 40.543 | 2.077 | | |
| 7 | 41.889 | 1.527 | 1.76182 | 27.5 |
| 8 | 15.566 | 7.247–25.603 | | |
| 9 | 66.442 | 1.527 | 1.77250 | 49.6 |
| 10 | 20.897 | 2.329 | 1.74077 | 27.8 |
| 11 | 30.363 | 10.753–3.410 | | |
| 12 | −68.557 | 1.527 | 1.51633 | 64.1 |
| 13 | −183.222 | 14.075–3.061 | | |
| 14 | 45.135 | 4.055 | 1.53172 | 48.9 |
| 15 | −240.880 | | | |

8. A telephoto lens system as recited in claim 6:
wherein said first, second, third and fourth lens elements of said first lens unit are respectively identified by i=1, 3, 5 and 7, said lens elements of said second lens unit in order from said object side are respectively identified by i=9 and 10, said lens element of said third lens unit is identified by i=12 and said lens element of said fourth lens unit being identified by i=14;

wherein an i-th one of said lens elements has a radius of curvature facing toward said object side of $r_i$, a radius of curvature facing away from said object side of $r_{i+1}$, a thickness of $d_i$, an axial distance to a separated lens element on a side away from said object side of $d_{i+1}$, and a refractive index of $N_i$; and wherein said i-th lens elements satisfy the following table:

| i | $r_i$ | $d_i$ | $N_d$ | $\nu_d$ |
|---|---|---|---|---|
| 1 | 67.026 | 3.730 | 1.60311 | 60.7 |
| 2 | 556.533 | 0.153 | | |
| 3 | 32.907 | 4.379 | 1.60311 | 60.7 |
| 4 | 73.441 | 0.130 | | |
| 5 | 23.514 | 4.477 | 1.72916 | 54.7 |
| 6 | 41.388 | 2.244 | | |
| 7 | 41.284 | 1.664 | 1.78470 | 26.2 |
| 8 | 16.233 | 7.131–25.055 | | |
| 9 | 127.347 | 2.176 | 1.80518 | 25.4 |
| 10 | −581.729 | 1.527 | 1.77250 | 49.6 |
| 11 | 35.225 | 9.973–1.907 | | |
| 12 | −676.392 | 1.527 | 1.48749 | 70.1 |
| 13 | 2975.803 | 14.725–4.867 | | |
| 14 | 44.422 | 3.818 | 1.53172 | 48.9 |
| 15 | 3489.672 | | | |

9. A telephoto lens system as recited in claim 6:
wherein said first, second, third and fourth lens elements of said first lens unit are respectively identified by i=1, 3, 5 and 7, said lens elements of said second lens unit in order from said object side are respectively identified by i=9 and 10, said lens element of said third lens unit is identified by i=12 and said lens element of said fourth lens unit being identified by i=14;

wherein an i-th one of said lens elements has a radius or curvature facing toward said object side of $r_i$, a radius of curvature facing away from said object side of $r_{i+1}$, a thickness of $d_i$, an axial distance to a separated lens element on a side away from said object side of $d_{i+1}$, and a refractive index of $N_i$; and wherein said i-th lens elements satisfy the following table:

| i | $r_i$ | $d_i$ | $N_d$ | $\nu_d$ |
|---|---|---|---|---|
| 1 | 60.343 | 4.103 | 1.48749 | 70.1 |
| 2 | 905.499 | 0.153 | | |
| 3 | 35.340 | 3.936 | 1.67000 | 57.4 |
| 4 | 69.951 | 0.130 | | |
| 5 | 21.763 | 4.295 | 1.77250 | 49.6 |
| 6 | 32.066 | 2.244 | | |
| 7 | 30.845 | 1.664 | 1.80518 | 25.4 |
| 8 | 15.394 | 7.548–25.173 | | |
| 9 | 50.275 | 2.176 | 1.84666 | 23.9 |
| 10 | 64.952 | 1.527 | 1.83481 | 42.7 |
| 11 | 28.119 | 11.166–5.879 | | |
| 12 | −91.525 | 1.527 | 1.77250 | 49.6 |
| 13 | −1975.203 | 13.947–1.609 | | |
| 14 | 46.649 | 4.233 | 1.53172 | 48.9 |
| 15 | −140.980 | | | |

* * * * *